United States Patent [19]
Boers et al.

[11] Patent Number: 5,637,846
[45] Date of Patent: *Jun. 10, 1997

[54] METHOD AND APPARATUS FOR ELECTRONIC PAYMENT BY A CLIENT IN A SELF-SERVICE STORE

[75] Inventors: Jan Boers, Amsterdam; Ronald J. van Solt, Gm Edan, both of Netherlands

[73] Assignee: Ahold Retail Services AG, Klosters, Switzerland

[*] Notice: The term of this patent shall not extend beyond the expiration date of Pat. No. 5,397,882.

[21] Appl. No.: 278,872

[22] Filed: Jul. 21, 1994

Related U.S. Application Data

[63] Continuation-in-part of Ser. No. 63,581, May 14, 1993, Pat. No. 5,397,882.

[30] Foreign Application Priority Data

May 4, 1994 [NL] Netherlands ............... 9400743

[51] Int. Cl.⁶ .................................................. G06K 15/00
[52] U.S. Cl. ...................... 235/383; 235/382; 235/384
[58] Field of Search ................................. 235/382, 383, 235/472, 384

[56] References Cited

U.S. PATENT DOCUMENTS

| | | | |
|---|---|---|---|
| 3,428,959 | 2/1969 | Acker. | |
| 3,749,191 | 7/1973 | Ashen et al.. | |
| 3,836,755 | 9/1974 | Ehrat. | |
| 3,878,365 | 4/1975 | Schwartz | 235/383 |
| 4,108,204 | 8/1978 | Koenig et al.. | |
| 4,157,738 | 6/1979 | Nishiguchi et al.. | |
| 4,180,204 | 12/1979 | Koenig et al. | 235/385 |
| 4,373,133 | 2/1983 | Clyne et al.. | |
| 4,501,958 | 2/1985 | Glize et al. | 235/384 |
| 4,676,343 | 6/1987 | Humble et al. | 235/383 |
| 4,964,053 | 10/1990 | Humble | 235/383 |
| 5,013,896 | 5/1991 | Ono et al. | 235/375 |
| 5,027,380 | 6/1991 | Randalman | 364/406 |
| 5,083,638 | 1/1992 | Schneider | 235/383 |
| 5,206,488 | 4/1993 | Teicher | 235/380 |
| 5,361,871 | 11/1994 | Gupta | 235/383 |

FOREIGN PATENT DOCUMENTS

| | | |
|---|---|---|
| 0003557 | 8/1979 | European Pat. Off.. |
| 0086059 | 8/1983 | European Pat. Off.. |
| 0110085 | 6/1984 | European Pat. Off.. |
| 0390448 | 10/1990 | European Pat. Off.. |
| 1472749 | 1/1967 | France. |
| 2679677 | 1/1993 | France. |
| 3940605 | 6/1991 | Germany. |
| 8800907 | 11/1989 | Netherlands. |
| 9002296 | 5/1992 | Netherlands. |
| 1267630 | 3/1972 | United Kingdom. |
| 2068132 | 8/1979 | United Kingdom. |
| 2064184 | 6/1981 | United Kingdom. |
| 2068132 | 8/1981 | United Kingdom. |
| 2117709 | 10/1983 | United Kingdom. |
| 2178576 | 2/1987 | United Kingdom. |
| WO89/06406 | 7/1989 | WIPO. |
| WO91/18373 | 11/1991 | WIPO. |
| WO91/19961 | 12/1991 | WIPO. |

OTHER PUBLICATIONS

IBM Technical Disclosure Bulletin, vol. 18, No. 8, Jan. 1976, Armonk, New York, USA, pp. 2556–2557, G. Allmendiger et al. "Point-of-Sale Terminal Systems with Enhanced Operational Flexibility and Security".

*Primary Examiner*—Harold Pitts
*Attorney, Agent, or Firm*—Pennie & Edmonds, LLP

[57] ABSTRACT

The invention relates to a store arrangement for purchasing articles in a self-service store according to a self-registration system whereby a client himself registers articles selected by him with a scanner. The store arrangement includes at least one identification device for recognizing a client and a readout station for reading out the articles registered with the scanner. The store arrangement further comprises a paying station for paying in electronic manner and without intervention of store personnel for articles read from the scanner by the readout station, and for clearing a passage for the client to leave the store when the articles have been paid for in electronic manner.

59 Claims, 2 Drawing Sheets

METHOD AND APPARATUS FOR ELECTRONIC PAYMENT BY A CLIENT IN A SELF-SERVICE STORE

CROSS REFERENCE TO RELATED APPLICATIONS

This application is a continuation-in-part of application Ser. No. 08/063,581, filed May 14, 1993, now U.S. Pat. No. 5,397,882.

FIELD OF THE INVENTION

This invention relates to a store arrangement for purchasing articles in a self-service store according to a self-registration system whereby a client registers articles selected by him with a scanner, comprising at least one identification device for recognizing a client and a readout station for reading out the articles registered with the scanner.

This invention further relates to a paying device for use in such a store arrangement and a method for implementing such a self-registration system.

BACKGROUND OF THE INVENTION

A store arrangement as described hereinabove is disclosed, for instance, in U.S. application Ser. No. 08/063,581, now U.S. Pat. No. 5,397,882, incorporated herein by reference. This patent application discloses a self-service store, such as for instance a supermarket, where clients who take part in the self-registration system can obtain a scanner near the entrance of the store. In this store arrangement, for that matter, the scanner is not issued until the client has been identified.

The scanner may for instance comprise a barcode reader with which a product code present on a product selected by the client can be scanned by the client to be subsequently stored in a memory of the scanner. Naturally, the barcode may also be provided on the product by the client himself, for instance in cases where the client composes a product himself and subsequently weighs it using a weighing device, whereafter the weighing device produces a sticker with a barcode to be attached to the product.

When the client has finished shopping, he proceeds to a readout station where the information about the registered articles as stored in the memory of the scanner is read out. The readout station then prints a receipt listing all the articles registered by the client. The client takes the receipt to a cash desk, known per se, and submits it to a member of the store personnel, whereafter payment can be effected on the basis of the receipt with generally known instruments of payment. If applicable, a spot check can take place to verify whether the information stored in the memory is correct, i.e. corresponds with the articles selected by the client. Payment is effected in a manner corresponding with payment occurring at a cash desk where the articles are consecutively entered in the cash register by the store personnel member himself or are registered through a barcode.

After paying and handing in the scanner, the client can leave the store. An advantage of such a system is that the queues at a cash desk are reduced considerably because the selected goods no longer need to be registered one by one at a cash desk. Partly because of the great success of the system, there is a need for a system that can function even faster and more efficiently. Because many clients make use of the system, it is still possible in particular cases that short queues form at a cash desk because, depending on the mode of payment, it may still take a length of time to pay the amount indicated on the receipt.

SUMMARY OF THE INVENTION

The object of the present invention is to provide a store arrangement which removes the above-mentioned disadvantage and moreover is so flexible that many other wishes on the part of the client can be complied with.

To realize this object, in accordance with the invention, the store arrangement further comprises paying means for paying in electronic manner and without intervention of store personnel for articles read from the scanner by the readout station and for clearing a passage for the client to leave the store when the articles have been paid for in electronic manner. This means that the client can leave the self-service store virtually directly after he has finished shopping and had his scanner read out without intervention of store personnel.

Preferably, the paying means comprise at least one closable passage which is normally closed and is automatically opened when the electronic payment has been effected. This prevents the possibility of the client leaving the store without paying.

In particular, the paying means comprise at least one paying station for recognizing a client's payment card, the electronic payment being effected after the payment card has been read out by the paying station. Accordingly, after the client has had the scanner read out, he can proceed directly to the paying station to pay electronically in the manner indicated and subsequently leave the store.

In accordance with the invention, several variants of identifying the client are possible. According to one possible exemplary embodiment of the invention, a client's identity can be determined through the recognition of the payment card. In that case the paying station also functions as an identification device. In that case a client's identity need in principle be determined only at the time of his electronic payment.

It is also posssible, however, that the arrangement further comprises a dispensing station from which a client who wishes to make use of the self-registration system can remove a scanner, for instance directly upon entering the store. The dispensing station preferably clears a scanner after identification of a client's identity card by means of the identification system. This can, for instance, prevent anonymous clients from taking a scanner home inadvertently without using it for the intended purpose. The scanner is assigned to the client and it is possible to determine automatically whether the scanner is handed in again, for instance at the readout station. Thus it can also be monitored whether a scanner is handed in again within a reasonable period of time after removal from the dispensing station, for instance within a maximum period of three hours.

In assigning scanners to clients, it can automatically be updated which scanner has been assigned to a particular client. For that purpose, the client's identity can be temporarily stored in the memory of the assigned scanner. On the other hand, it is also possible—for instance, if the scanners are numbered—to store in a memory of the store arrangement which scanner has been assigned to a client. In any case, in this example a client's identity can be determined by the store arrangement in cooperation with a scanner when the latter is read out by the readout station.

The identification device preferably comprises a scanning device with which the information stored on and/or in the identity card can be read. The identification device may comprise a keyboard for entering a PIN code.

If the client has already been identified upon entering the store on the basis of the identity card as described hereinbefore, it is possible, in accordance with the invention, for the electronic payment to be effected when the client places the scanner in the readout device, whereafter the passage is cleared and the client can leave the store. In that case the client need not identify himself anymore when leaving the store, for instance through his payment card. The identity card can be a bank card, a Giro card or a credit card, so that a client's account can be determined when he identifies himself upon entering the store. However, if the identity card is a customer card, the bank account in question can be permanently stored in a memory of the store arrangement when the customer card is being issued.

It has nevertheless been found in practice to be preferable that the paying means in the latter case, too, comprise a paying station for recognizing a client's payment card, the electronic payment being effected after the payment card has been read by the paying station. In this particular case, therefore, a scanner is issued to the client upon his presenting his identity card after entering the store and, prior to his leaving the store, i.e. after the scanner has been read out, the client pays electronically without intervention of store personnel upon presenting his payment card to the store arrangement. After electronic payment the store arrangement automatically grants the client passage to leave the store.

Both the identity card and the payment card can for instance be a customer card, a bank card, a Giro card or a credit card and may moreover be one and the same card.

According to the invention, the paying device is suitable for paying in electronic manner and without intervention of store personnel for articles read from the scanner by a readout station and for granting the client passage to leave the store when the articles have been paid for in electronic manner.

The method referred to is characterized according to the invention in that the articles read from the scanner by the readout station are electronically paid for by the client using a paying device without intervention of store personnel, whereafter the device grants the client passage to leave the store.

BRIEF DESCRIPTION OF THE DRAWING

The invention will be further elucidated with reference to the accompanying drawings. In the drawing.

DETAILED DESCRIPTION OF THE INVENTION

Figure 1:
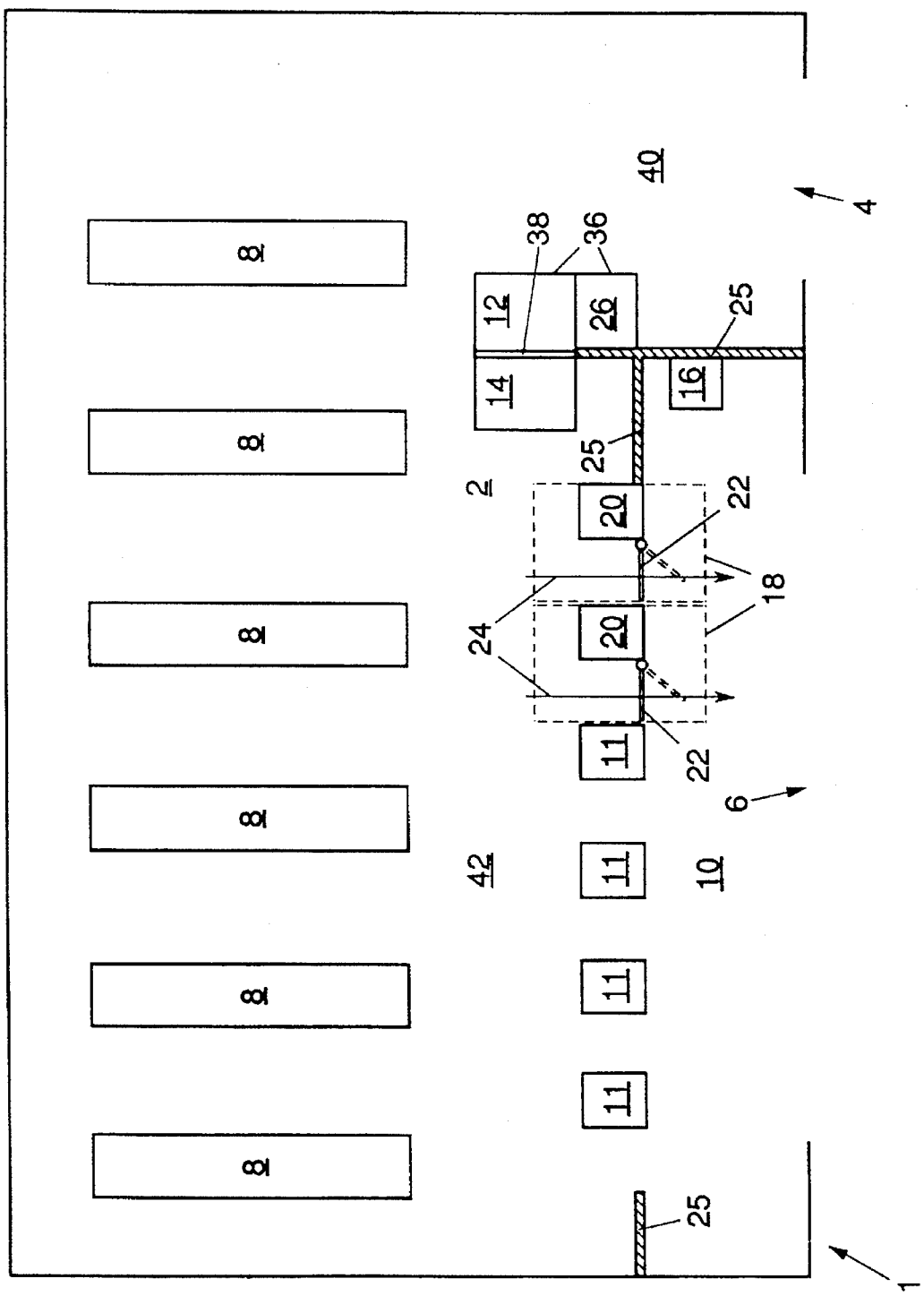
FIG. 1 is a map of a self-service store with a possible store arrangement in accordance with the invention.

FIG. 1 schematically shows a map of an example of a self-service store 1 with a self-registration system 2 according to the invention. The store 1 comprises an entrance 4 and an exit 6. The store further comprises racks or shelves 8 where various articles are presented for sale and a cash desk section 10 with manned cash desks 11 where the articles selected by a client can be paid for in the usual manner. A client can obtain a trolley, for instance outside the store 1, which he can run along the shelves 8 to load the desired articles into the trolley to subsequently pay for them in the cash desk section 10 and to leave the store through the exit 6.

The self-registration system 2 in this exemplary embodiment comprises a dispensing device 12 with portable scanners, arranged near the entrance 4 of the store. The scanners are of a generally known type and each comprise, for instance, a scanning head which can be manually brought close to a code provided on the articles, for the code to be read and subsequently stored in a memory of the scanner. For the purpose of coding articles, typically use is made of a barcode provided on the articles. For that purpose the scanner may be provided with an optical scanning head to enable the codes to be read. This, however, is by no means essential to the invention because in principle other types of systems for coding the articles can be used as well, e.g. magnetic codes, binary codes stored in a chip and other current systems.

The self-registration system 2 further comprises a readout station 14, arranged near the exit 6, in which the codes of articles stored in the memory of a scanner can be read. The information read by the readout station 14 is fed to an information processing means such as a computer 16 for further processing. In accordance with the invention, the self-registration system further comprises two identical paying devices 18, to be described hereinafter, which are also connected to the computer 16. The paying device 18 in this example comprises a paying station 20 and a power-controlled gate 22 which is normally closed, blocking a client's passage to the exit of the store along a path 24. The dispensing device 12, the readout station 14 and the paying devices 18 in this example are connected with the computer 16 by means of lines not shown. The store is designed with partitions 25 in such a manner that a client can leave the store via a cash desk 11 or via the paying device 18.

A possible further elaboration of the self-registration system will hereinafter be set out as an exemplary embodiment. When a client enters the store, a scanner will be assigned to him upon his presenting an identity card. This can be effected automatically, but not necessarily so. In the case where the above does take place automatically, as in this example, the self-scanning system may for that purpose comprise an identification device 26 which is also connected to the computer 16.

For that purpose the identification device 26 comprises an insertion slot in which a card-shaped ID can be inserted, as well as a card reader adapted to read information stored on and/or in the identity card. To render the system fraud-insensitive, the identification device 26 may further comprise a keyboard for entering a PIN code. Stored in the computer 16 are the client data. It is also possible, however, that these data are stored on and/or in the identity card, so that these data can be read out. After a client has had his identity card read out and, if applicable, entered a PIN code, it is determined by the computer whether a scanner can be assigned to the client. A scanner may, for instance, not be assigned in cases where no data on a particular client are stored in the computer.

In this example the dispensing station 12 consists of a rack with a plurality of holders in which the scanners are stored. Preferably, each scanner is provided with a unique identification code, which can be detected by detection means arranged in the holders of the dispensing station. The computer 16 then knows which scanner has been cleared and knows the identity of the client identified by means of the identification card.

The identification device 26 may further comprise a display, not shown here, on which it can be indicated which scanner is being released. It is also possible, however, that, for instance in the dispensing station 12, a lamp lights up by the holder of the scanner which is being released for the client in question. As an identity card, for instance a bank card, a Giro card, a credit card or a customer card or pass can be used.

The client then takes hold of the scanner in question and takes it into the store.

After the client has registered the articles selected by him, he proceeds to the readout station 14 where the scanner is placed in positions intended for that purpose. For this purpose the readout station 14 preferably comprises a rack with holders in which the scanners can be placed. A holder of the readout station comprises detection means with which information can be read from the memory of the scanners. In addition, the readout station functions as a collecting place of scanners used by clients.

The readout station 14 then reads the data of the articles registered in the memory of the scanner and passes the data on to the computer 16. The readout station also transmits to the computer which scanner the relevant data stem from. The computer 16 now knows the amount to be paid by an identified client.

Preferably, the readout station 14 further comprises a receipt printer which issues a receipt stating particulars of the articles which have been read out, including the total amount to be paid for the articles.

The client proceeds to one of the paying devices 18. The paying station 20 of the paying device 18 in this example comprises means for recognizing a client's payment card. The payment card comprises inter alia data about the client's identity. The client shows his payment card to the paying station, whereafter the paying station reads the data from the payment card and transmits the data to the computer. The computer is adapted to subsequently permit the client in question to pay the amount due in electronic manner. After the client has paid in electronic manner by simply presenting his payment card to the paying station 20, the gate 22 is automatically opened and the client can leave the store via path 24. The major advantage is that payment takes place without any intervention on the part of store personnel.

As a payment card, inter alia a bank card, a Giro card or a credit card can be used. The relevant bank account, Giro account or credit card number can then be read out simultaneously with the client's identity by the paying station 20 and transmitted to the computer 16. In this manner the computer 16 knows from which account of the client the amount due can be transferred electronically. It is also possible that the card data are read out and that these data, together with PIN code and the amount due, are sent via Beanet to a card-issuing bank for electronic payment. In that case the paying station needs to have been approved by Beanet. If, for instance, a contactless chip card or a hand scanner with transmitter/receiver were to be used as an identification and payment card, the gate 22 in FIG. 2 could, in accordance with a highly advanced embodiment, be replaced with an acoustic and/or light signal. Thus clients who have or have not paid according to the standing procedure can be separated at the exit of the store. A contactless chip card then comprises for instance a transponder which is read out by means of an interrogation field. When the client's identity has thus been determined, it can be verified whether he has already paid electronically. If he has not paid and attempts to leave the store, the signal referred to will be given. In the case of the hand scanner with transmitter/receiver, the same procedure applies. In this case, however, the client will take the hand scanner outside the store.

It is also possible, however, to use a customer card issued to the client by a store. The customer card comprises information, which may or not be coded, about the client's identity, which can be recognized by the computer 16. It is not necessary that the customer card comprises information about the number of the client's account from which the amounts due are to be transferred. Because a customer card is issued in a customer's name, it may for instance be stored permanently in the computer 16 from which account a client desires to transfer the amount due. After the information concerning the identity of a customer card has been read by the paying station 20 and fed to the computer 16, the computer 16 determines what amount is due and from which account the amount in question is to be transferred.

When a client has been identified by means of his identity card using an identification device, then, as described above, an identified scanner can be assigned to an identified client because the computer records to which client a scanner with a particular code has been assigned. In accordance with the invention, however, it is also possible to use scanners which are not provided with a readable fixed code. For that purpose, the client's identity is stored in the memory of the scanner by means of the readout station before the scanner is issued to an identified client. When subsequently the memory of the scanner is read by the readout station 14, it will be clear immediately which articles have been registered by a particular client.

Figure 2:
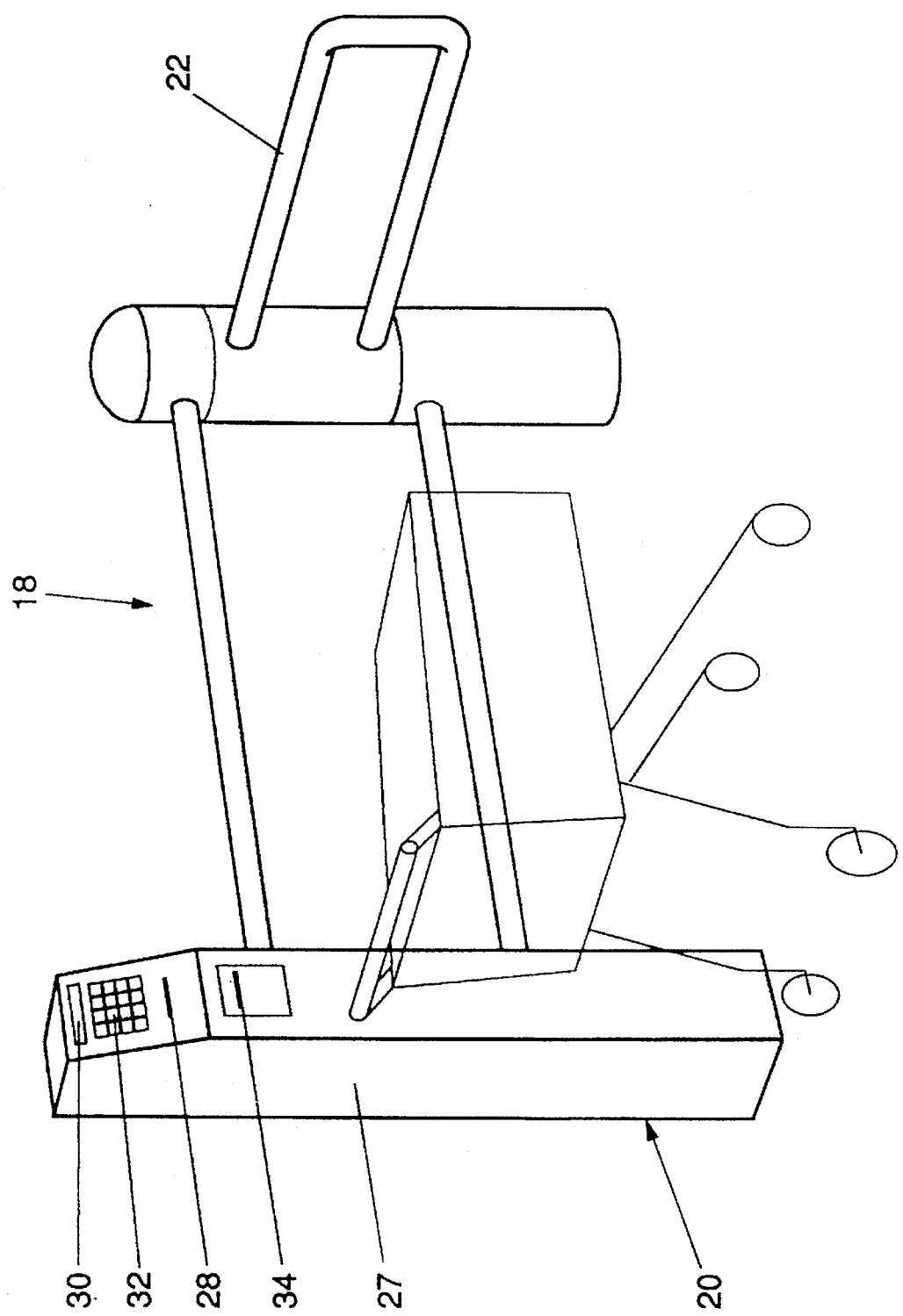
FIG. 2 shows a paying device of FIG. 1.

As is shown in FIG. 2, the paying device 18 consists, for instance, of a paying station 20 in the form of a vertically directed pillar 27 and a gate 22 mechanically connected therewith. The paying station 20 comprises an insertion slot 28 in which a card-shaped payment card can be inserted, as well as a card processing unit 35, which can read information stored on and/or in the payment card. Preferably, the card unit is also adapted for writing information on and/or in the payment card. The paying station comprises a display 30 on which the client can be shown, for instance, information about the articles read out by the readout station and/or the payment card read by the card unit. The paying station 20 further comprises a keyboard 32 with which a client can, for instance, answer questions displayed on the display 30. In particular, the keyboard 32 comprises at least two keys by which the client can indicate whether he does or does not agree with the information displayed on the display 30 about the electronic payment transaction to be performed. In general, however, there will be a more or less extensive keyboard to set up dialogues between the client and the system.

Because the client in this example has already entered a PIN code for the purpose of obtaining a scanner, it is not necessary for him to do this again at the paying station 20. In accordance with the invention, it is, of course, possible to require, as an additional safety measure, that the client does enter a PIN code for the activation of the electronic transaction.

According to one possible embodiment (not shown), the display 30 and the keyboard 32 are incorporated into a touch screen.

The paying station 20 further comprises a receipt printer 34 which issues a receipt on which particulars of the electronic transaction are printed.

According to one embodiment of the store arrangement 2, the card unit of the paying station 20 writes information on and/or in the payment card regarding, for instance, trading stamps, control parameters, date of last visit, frequency of visits and/or the average amount of the expenditures. If a client desires to receive trading stamps, these may for instance be entered on his payment card. After a client has done his shopping a number of times and trading stamps have been entered on his payment card, he can decide to hand in these stamps in exchange for money. Handing in the stamps and cashing them can again be carried out entirely electronically. The display 30 shows, for instance, the number of stamps when the payment card is inserted in the slot 28. By means of the keyboard 32 the client can indicate that he desires to hand in the stamps. Of course, the client can also decide to save the stamps and simply have new stamps entered. The value of the stamps is then subtracted from the amount due and thus balanced entirely automatically. The above is preferably also printed by the receipt printer 34 on a receipt for the client's administration.

With regard to the balancing of deposit money and parking fees, many variants are conceivable in accordance with the invention. If, for instance, a client hands in bottles at a counter in the store intended for that purpose, the value (credit) of the bottles that are handed in can be credited to the payment card in a manner which is known per se. On the other hand, for parking a car outside the store, a negative (debit) amount can be entered in the card. These amounts can subsequently be read out by the paying station 20 and balanced electronically after the client's approval as indicated, for instance, through operation of the keyboard 32.

If a client does not wish to pay electronically, he can, if so desired, take the receipt issued by the readout station 14 to a regular cash desk 11 in the cash desk section which is manned by store personnel. Payment can then take place in the conventional manner through intervention of store personnel.

It will be clear that many variants of the store arrangement are conceivable that fall within the concept of the invention. Thus, both the identity card and the payment card may be a customer card, a bank card, a Giro card or a credit card. Moreover, the identity card and the payment card can be one and the same card.

In the above example regarding electronic balancing of trading stamps and the like, it was mentioned that the relevant information was written on the payment card. In that case the payment card cannot be a bank card, Giro card or credit card because no information can be written on them. It is also possible, however, that the information concerning, for instance, the trading stamps is permanently stored in the computer 16. When a client hands in bottles and/or parks his car, a store worker can write the relevant information in the computer 16. After a client has then been identified at the paying station 20 through his card, the computer 16 shows on the display 30 the information about the trading stamps, deposit money, etc., stored in its memory. The client can then indicate through the keyboard again in which way the amounts in question are to be balanced, and/or stamps are to be entered in the memory of the computer 16.

According to an alternative embodiment of the store arrangement 2, every client can, if desired, take a scanner from the dispensing station 12 upon entering the store without identifying himself. The client then proceeds to do his shopping in the usual manner using the scanner and registers the articles selected by him in the scanner. For that purpose, every scanner may be provided with a unique code which can also be read by the readout station 14. This code is also legibly provided on the scanner. When the client re-places the scanner in the readout station 14, the registered articles are read out together with the code of the scanner. When the client subsequently identifies himself at the paying station 20 with his payment card, he should enter the code of the scanner used by him via the keyboard 32, so that the computer knows which scanner has been used by the client. In that case the client does have to enter a PIN code on the keyboard 32 for the definitive effectuation of the electronic payment.

According to a particular embodiment of the invention, the paying station 20 is omitted and the gate 22 is placed directly by the readout station. The client presents his identification card to the identification device 26 upon entering the store and is identified as described above. The client's identity can be stored in the computer 16 together with a unique code of the scanner obtained by him. It is also possible, however, for the client's identity to be stored in the scanner. In any case, the device is capable of determining which scanner is being used by what client. After the client has finished shopping, he proceeds to the readout station 14 and places his scanner in the readout station 14. The relative positions of the readout station and the gate are such that a client can place his scanner in the readout station only if no other client is located before the closed gate. As soon as the scanner has been placed in the readout station, the client's identity is established on the basis of the information (unique code or client's identity) read from the scanner. Further, the registered goods are read out. The readout station may in this example comprise a keyboard and a display as discussed in relation to paying device 18. If the client agrees with the electronic financial transaction proposed on the display and has answered the questions, if any, shown on the display through the keyboard, he can press a key of the keyboard so that the amount is paid electronically. The gate then opens automatically and the client can leave the store without having to show his payment card or identity card (again) to the store arrangement. If the client data have been stored in the scanner, it is further possible to incorporate a transmitter/receiver into the hand scanner, which makes it possible, by means of transmitter/receivers arranged in the store (in the ceiling, the floor, furniture, peripheral devices, the shopping trolley, etc.), to respond to the hand scanners (tracking clients, exchange of information or messages, control of peripheral equipment, etc.).

In the exemplary embodiments described hereinabove, the store arrangement may comprise a checking device as described in the previously mentioned U.S. application. In accordance with a predetermined stochastic procedure, the checking device produces a signal indicating that a check of the goods registered by a client with the scanner should take place. Accordingly, the signal can be given when a client places his scanner in the readout station. The client should then proceed to one of the regular cash desks of the cash desk section 10 or a separate spot-check cash desk and have the selected articles checked.

It is also possible for the above signal to be given when the client is located at the paying device 18. If the client agrees with the electronic financial transaction proposed on the display 30, he can press a key on the keyboard 32 to indicate that he agrees with the proposed transaction. Thereafter the gate is opened for a brief period, so that the client can proceed through the gate to a spot-check cash desk, which in this case is arranged between the exit 6 and the cash desk section 10. The time during which the gate 22 is open is chosen to be such that the client has no opportunity to dispose of certain articles present in his trolley. If it is subsequently found at the spot-check cash desk that the payable amount of the scanned articles is incorrect, corrective payment can take place. It is here possible for the electronic payment proper to take place at the spot-check cash desk. It is also possible, however, for payment to take place when the client is at the paying device 18 and presses a key of the keyboard 32 to indicate that he agrees with the proposed transaction. In this latter case, if the spot check has revealed that the amount to be paid is incorrect, actual settlement should be effected inasmuch as the client must make an additional payment or an amount of money is paid back to him. Such settlement can of course be effected electronically as well. It is further observed that the signal can be given right before the client operates the keyboard 32, but also, and preferably so, right after a client operates the keyboard to indicate that he agrees with the proposed financial transaction.

According to a particular embodiment, the dispensing station and the readout station are incorporated into a scanner station 36, the scanner station 36 being accessible from two store sections 40, 42, in this case separated by a partition 38, as shown in FIG. 1, where, in particular, the scanner station 36 also comprises the identification device 26 referred to.

We claim:

1. A store arrangement for purchasing articles in a self-service store according to a self-registration system whereby a client registers articles selected by him with a scanner, comprising at least one identification device for recognizing a client and a readout station for reading out the articles registered with the scanner, characterized in that the store arrangement further comprises paying means for paying in electronic manner and without intervention of store personnel for articles read from the scanner by the readout station, and for clearing a passage for the client to leave the store when the articles have been paid for in electronic manner.

2. A store arrangement according to claim 1, characterized in that the paying means comprise at least one closable passage which is normally closed and is automatically opened when the electronic payment has been effected.

3. A store arrangement according to claim 1, characterized in that the paying means comprise at least one paying station for recognizing a payment card belonging to a client, the electronic payment being effected after the payment card has been read out by the paying station functioning as identification device.

4. A store arrangement according to claim 3, characterized in that the paying station comprises a card processing unit by which the information stored on and/or in the payment card can be read.

5. A store arrangement according to claim 4, characterized in that the paying station includes a card processing unit for writing information on and/or in the payment card.

6. A store arrangement according to claim 5, characterized in that the card processing unit is capable of writing on and/or in the payment card, information about trading stamps, control parameters, date of last visit, frequency of visits and/or the average amount of the expenditures.

7. A store arrangement according to claim 3, characterized in that the paying station comprises a display on which the client can be shown inter alia information about the articles read out by the readout station and/or the payment card read out by the paying station.

8. A store arrangement according to claim 7, characterized in that the paying station comprises a keyboard by which a client can answer questions shown on the display.

9. A store arrangement according to claim 8, characterized in that the keyboard comprises at least two keys by which the client can indicate whether he agrees or does not agree with a payment transaction shown on the display.

10. A store arrangement according to claim 8, characterized in that the display and the keyboard are incorporated into a touch screen.

11. A store arrangement according to claim 3, characterized in that the paying station comprises a receipt printer which issues a receipt on which particulars of the electronic transaction are printed.

12. A store arrangement according to claim 3, characterized in that the closable passage and the paying station are connected to each other and together form a paying device.

13. A store arrangement according to claim 3, characterized in that the paying station is in the form of a vertically arranged pillar.

14. A store arrangement according to claim 13, characterized in that the pillar is mechanically connected to a gate adapted to be electrically opened and closed to open and close said passage, the pillar and the gate and the closable passage in combination forming said paying device permitting a client to pay electronically and subsequently leave the store through the opened gate and passage.

15. A store arrangement according to claim 1, characterized in that the arrangement further comprises a dispensing station from which a client desiring to utilize the self-registration system can remove said scanner.

16. A store arrangement according to claim 15, characterized in that the dispensing station releases a scanner after recognition of an identity card, owned by the client, by the identification device.

17. A store arrangement according to claim 16, characterized in that the identification device comprises an insertion slot in which said identity card can be inserted, as well as a card reader capable of reading information stored on and/or in the identify card.

18. A store arrangement according to claim 17, characterized in that the identification device comprises a keyboard for entering a PIN code.

19. A store arrangement according to claim 16, characterized in that the dispensing station and the readout station are incorporated into a scanner station, the scanner station being accessible from two mutually separated sections of the store.

20. A store arrangement according to claim 19, characterized in that the scanner station also comprises said identification device.

21. A store arrangement according to claim 2, characterized in that the electronic payment is effected after the client has placed the scanner in the readout station, whereafter the passage is opened.

22. A store arrangement according to claim 1, characterized in that the paying means optionally implement an electronic balancing of trading stamps, deposit money and/or parking fees.

23. A store arrangement according to claim 1, characterized in that the arrangement further comprises an automatically operating checking device which, depending on a predetermined stochastic procedure, gives a signal indicating that a check of the goods registered with the scanner by a client should take place.

24. A store arrangement according to claim 3, characterized in that the payment card is one of a bank card, a Giro card, a credit card and a customer card.

25. A store arrangement according to claim 16, characterized in that the identity card is one of a bank card, a Giro card, a credit card, and a customer card.

26. A store arrangement according to claims 20, characterized in that the payment card and the identity card are one and the same card.

27. A store arrangement according to claim 1, characterized in that the arrangement further comprises a computer which in operation processes the information obtained by the identification device and the readout station, for implementing the electronic transaction.

28. A store arrangement according to claim 1, characterized in that the paying means comprise means for producing an acoustic or light signal which is generated when no passage is being granted to the client for him to leave the store.

29. A paying device for use in a self-service store adapted for use in a self-scanning system wherein clients register articles with scanners, characterized in that the paying device includes means for paying in an electronic manner and without intervention of store personnel for goods read from one of said scanners by a readout station, and for clearing a passage for the client to leave the store when the articles have been paid for in said electronic manner.

30. A paying device according to claim 29, characterized in that the paying device comprises a closable passage which is normally closed and is automatically opened when the electronic payment has been implemented.

31. A paying device according to claim 29, characterized in that the paying device comprises a paying station for recognizing a payment card belonging to a client, the electronic payment being implemented after the payment card has been read by the paying station.

32. A paying device according to claim 31, characterized in that the paying station comprises a card processing unit by which the information stored on and/or in the payment card can be read.

33. A paying device according to claim 32, characterized in that the card processing unit is also suitable for writing information on and/or in the payment card.

34. A paying device according to claim 31, characterized in that the paying station comprises a display on which the client can be shown, for instance, information about the articles read by the readout station and/or the payment card read by the paying station.

35. A paying device according to claim 34, characterized in that the paying station comprises a keyboard by which a client can answer questions displayed on the display.

36. A paying device according to claim 35, characterized in that the keyboard comprises at least two keys by which the client can indicate whether he agrees or does not agree with the payment transaction shown on the display.

37. A paying device according to claim 35, characterized in that the display and the keyboard are incorporated into a touch screen.

38. A paying device according to claim 31, characterized in that the paying station comprises a receipt printer which issues a receipt on which particulars of the electronic transaction are printed.

39. A paying device according to claim 31, characterized in that the closable passage and the paying station are connected to each other.

40. A paying device according to claim 31, characterized in that the paying station is in the form of a vertically arranged pillar.

41. A paying device according to claim 40 characterized in that the pillar is mechanically connected with a gate adapted to be electrically opened and closed.

42. A method for purchasing articles in a self-service store according to a self-registration system, wherein a client is identified, the client registers with a scanner articles selected by him and after registration of the selected articles the scanner is coupled with a readout station, characterized by the steps of paying for the articles read from the scanner by the readout station by electronic payment using a paying device without intervention of store personnel, and providing passage to the client to leave the store after making said electronic payment.

43. A method according to claim 42, characterized by implementing the electronic payment upon presentation of a payment card.

44. A method according to claim 42, characterized by issuing a scanner to the client after he has been identified.

45. A method according to claim 44, characterized by issuing a scanner upon presentation of an identity card.

46. A method according to claim 45, characterized by issuing a customer card, for functioning as said identity card, to a client desiring to utilize the self-registration system.

47. A method according to claim 42, characterized by issuing a customer card, for functioning as a payment card, to a client desiring to utilize the self-registration system.

48. A method according to claim 45, characterized by issuing the scanner after the client has supplied to the self-registration system a PIN code associated with the identity card.

49. A method according to claim 43, characterized by implementing electronic payment only after the client has fed to the self-registration system a PIN code associated with the payment card.

50. A method according to claim 42, characterized by issuing a transaction receipt to the client after the scanner has been read by the readout device.

51. A method according to claim 43, characterized by issuing a transaction receipt to the client when the electronic payment is implemented upon presentation of the payment card.

52. A method according to claim 42, characterized in that the electronic payment includes an electronic balancing of trading stamps, deposit money and/or parking fees.

53. A method according to claim 42, characterized by giving a signal, which is dependent on a predetermined stochastic procedure, indicating that a check of the goods registered by a client with the scanner should take place.

54. A method according to claim 53, characterized in that the stochastic procedure includes:
 a) issuing a check parameter to the client, said check parameter including client information relating to whether the client's use of the self-registration system is to be checked for accuracy after the client has registered the articles selected in the scanner, said self-registration system including information processing equipment for processing said client information;
 b) determining, by means of said processing equipment and said check parameter, whether a check should take place of the accuracy of the use of the self-registration system by the client; and
 c) carrying out a check if it is determined by means of the processing equipment that a check is to take place.

55. A method according to claim 54, wherein:
 a) the check parameter is an integer; and
 b) the step of determining whether a check should take place includes the steps of:
  1) generating, by means of the processing equipment, a first random integer;
  2) comparing, by means of the processing equipment, the random integer to a second integer; and
  3) carrying out a check if the generated random integer is related to the second integer in a predetermined way.

56. The method according to claim 55, wherein:
 a) the check parameter is a third integer;
 b) the random integer is no greater than the third integer;

c) the second integer is a predetermined integer no greater than the third integer; and d) a check is carried out if the generated random integer is equal to the predetermined integer.

57. A store arrangement according to claim 23 characterized in that the automatically operating checking device comprises:

a) a customer card for each client who is to use the system, each customer card including first client information identifying the client to whom the customer card is issued;

b) information processing means for processing the first client information contained on said customer card to identify the client;

c) a check parameter for each client stored in one of said customer card and the processing means, sad parameter including second client information relating to whether the client's use of the system is to be checked for accuracy after the client has registered the selected articles in the scanner;

d) a readout station for coupling the scanner to the information processing means to read the article information regarding the articles as registered in the scanner; and e) a check selection means for coupling the customer card to the information processing means to determine the identity of the client and for analyzing the check parameter of the client to determine and generate a signal specifying whether a check should take place of the accuracy of the use of the system for the client.

58. A store arrangement according to claim 57, characterized in that:

a) the processing means is constructed to analyze said check parameter by generating a first random integer and comparing the random integer with a second integer stored in the processing means to determine whether or not the random integer is related to the second integer and said check parameter in a predetermined way indicating that a check is to be made.

59. A store arrangement according to claim 58, wherein:

a) the check parameter is a third integer;

b) the random integer is no greater than the third integer;

c) the second integer is a predetermined integer no greater than the third integer; and d) the random integer is related to the second integer in said predetermined way when equal to the second integer.

* * * * *